Feb. 8, 1966  R. J. LEMIEUX ET AL  3,233,851
CABLE CLAMP
Filed Aug. 14, 1964  3 Sheets-Sheet 1
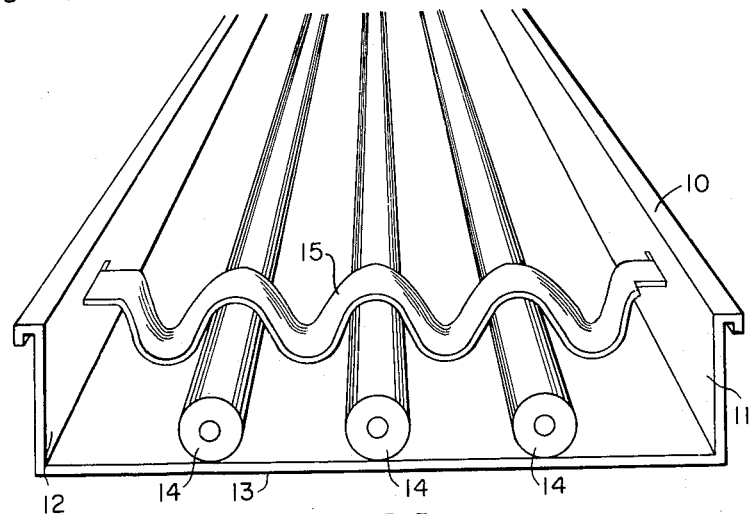
Fig.1
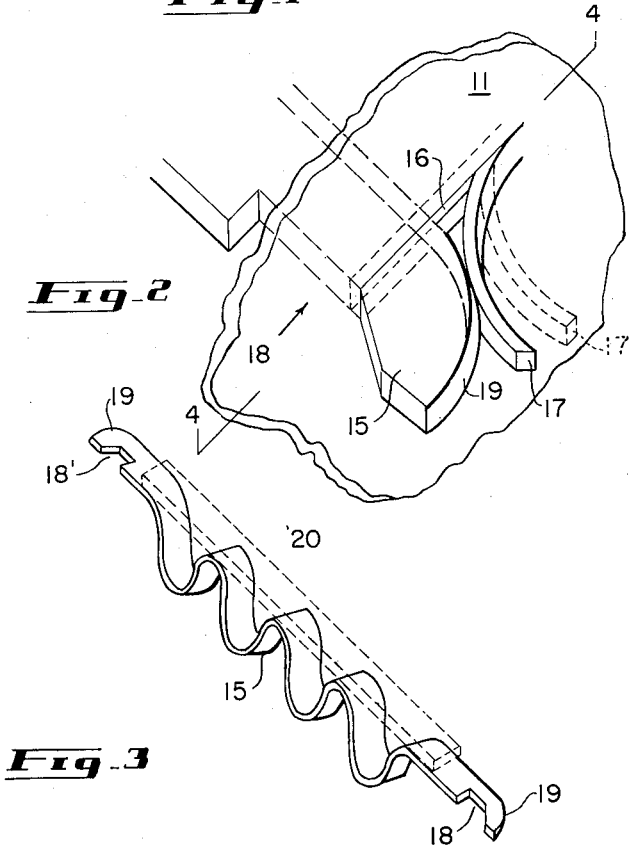
Fig.2
Fig.3

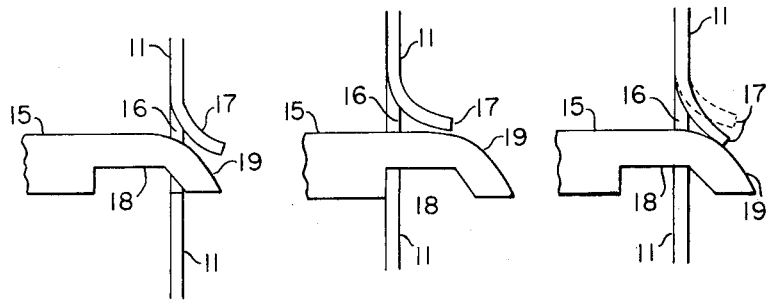
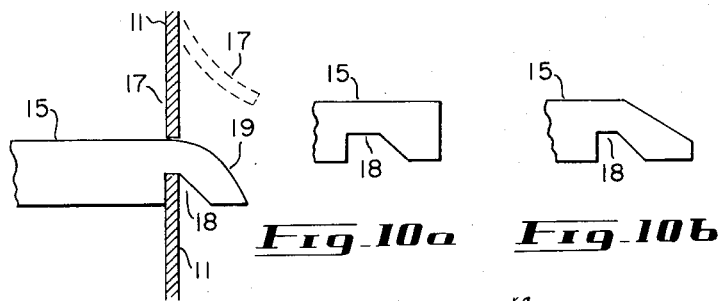
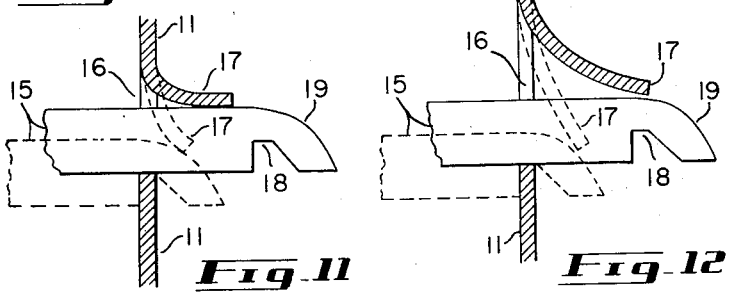
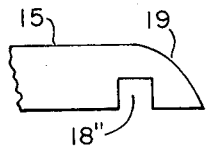
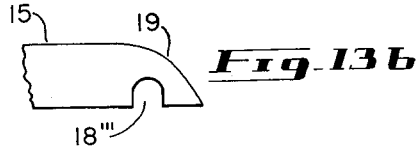
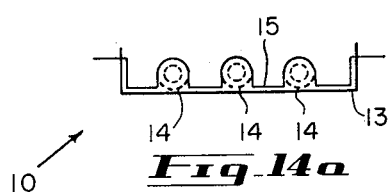

United States Patent Office 3,233,851
Patented Feb. 8, 1966

3,233,851
CABLE CLAMP
Roger J. Lemieux, Dollard des Ormeaux, Quebec, and Eugene A. Pytel, Pierrefonds, Quebec, Canada, assignors to Northern Electric Company Limited, Montreal, Quebec, Canada
Filed Aug. 14, 1964, Ser. No. 389,672
5 Claims. (Cl. 248—68)

The present invention relates to a cable clamp and spacer especially adapted for use with cable troughs, this clamp being extremely simple to manufacture and reliable in operation.

Clamps are commonly used in cable troughs to hold cables in position and to space the cables one from another. A problem with known types of cable clamps is that they have required various types of threaded fasteners to hold the clamp to the cable trough, which resulted in much slower insertion and removal of the cable clamp and added considerably to the expense of manufacturing and installing such clamps. With the clamp of the present invention no threaded fasteners are used and the clamp cooperates with the cable trough to provide a simple and strong fastening for the clamp which will ensure that the cables are not displaced.

The present invention provides a cable clamp for holding a cable in a cable trough provided with longitudinally extending pairs of slots with a tab on the exterior of each slot, said clamp comprising a strip having a centre portion shaped to conform to the cable to be held, a notch in one edge of the strip adjacent each end of the strip and adapted to engage the slots in the trough and to be held in position by the tabs.

In accordance with one form of the present invention, a cable clamp for use with a cable trough consists of a flat strip bent to conform to the cables being held, with a notch in one edge of the flat strip adjacent each end, the opposite edge of the strip being curved to join said one edge at the end of the strip. This clamping strip is intended to cooperate with the sides of a rectangular cable trough which are provided with slots formed by punching a tab from the interior to the exterior of the trough. These tabs are forced back against the curved edges of the clamp to lock the notches in the clamps against the edges of the slots and prevent removal of the clamps from the cable trough. In accordance with a preferred form of the invention the length of the full depth portion of the slot on one end of the clamp is equal to the distance between the other end of the clamp and the point at which the notch at said other end reaches its maximum depth.

Figure 4:
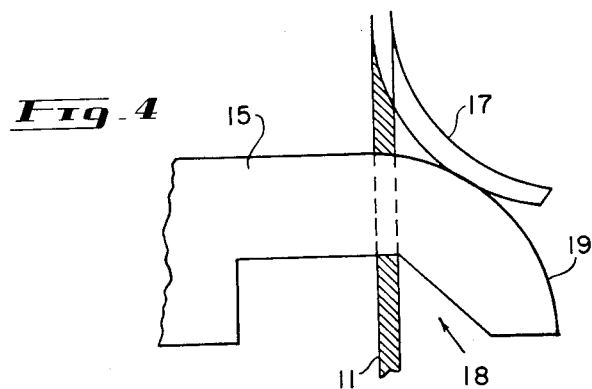
Figure 5:
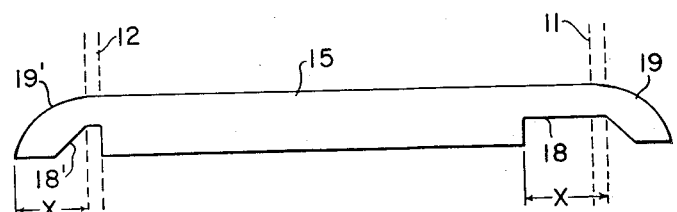

In drawings which illustrate embodiments of the invention:

FIGURE 1 is a perspective section of a cable trough showing a plurality of cables and a clamp in accordance with the invention holding them in position;

FIGURE 2 is a perspective view of the end of a clamp engaged in the slot in the wall of the cable trough, FIGURE 3 is a perspective view of a preferred form of clamp, FIGURE 4 is a section of the line 4—4 of FIGURE 2, FIGURE 5 is a plan view of a clamp in accordance with the invention illustrating one of the preferred features, FIGURES 6, 7a, 7b, 7c and 8 illustrate the insertion and fastening of a clamp in a cable trough, FIGURE 9 shows an alternative embodiment in accordance with the invention, FIGURES 10a and 10b show alternative ends for the clamps of the present invention, FIGURES 11 and 12 illustrate the assembly of a less preferred embodiment of the invention in a cable trough, FIGURES 13a and 13b illustrate alternative forms for the ends of the clamps, and FIGURES 14a and 14b illustrate alternative configurations of clamp for holding cables grouped in various arrangements.

When laying cables in a trough, the practice is uniformly to space the cables by measurement and to fasten each cable to the tray or trough with individual clamps held in place with threaded fasteners. This procedure is both time consuming and laborious. The present invention provides a practical means to simplify and speed up this operation considerably.

The cable clamp of the present invention consists of a flat bar or strip, pre-shaped to conform to the diameters and spacing of the cable or cables to be held by the clamp. The ends of the clamp are especially shaped to permit the clamp to be locked to the trough during installation. The metal cable troughs have slots with protruding tabs punched in their sides during manufacture in which the clamp ends are held.

FIGURE 1 shows a cable trough 10 having a pair of vertical sides 11 and 12 and a bottom 13 on which a plurality of cables 13 are resting. A cable clamp 15 constructed in accordance with one aspect of the present invention, with contours to fit the cables 14, is shown holding the cables 14 in a cable trough 10 in clamped and spaced relationship.

In FIGURES 2 and 4 the manner of fastening the clamp 15 to the sides 11 of the cable trough 10 is shown. This consists of a slot 16 formed by punching a tab 17 from the side of the trough 11 through which end of the clamp 15 projects. The clamp 15 is provided with a notch 18 in one edge of a curved portion 19 on the opposite edge. The notch 18 is adapted to engage the edge of the slot 16 remote from the tab 17 and the tab 17 is adapted to be deformed against the curved portion 19 of the clamp 15 to lock the clamp in position and to prevent removal of the clamp or accidental displacement of the cables in the cable trough.

In FIGURE 3 the clamp 15 is in perspective and the two ends of the clamp are clearly shown, both ends being provided with notches 18 and curved portions 19. As illustrated in FIGURE 3 a reinforcing bar or like device 20 shown in phantom may be fastened to the clamp 15 to increase the strength thereof when required.

Once the cables are laid in their approximate locations in the trough 10, the clamp 15 is fitted into the slots 16 and positioned, allowing the contours of the clamp 15 to rest comfortably on the cables 14. This is done by first inserting one end of the clamp 15 into a slot 16 on one side of the trough 10 far enough to permit the other end to drop inside the wall of the trough 10. With the cables 14 in position, the clamp 15 and cables 14 are moved laterally until the other end of the clamp 15 is inserted into its slot 16. The shapes of the ends of the clamp 15 will prevent the clamp 15 from being inserted in a reverse position.

With the clamp 15 in position, the tabs 17 of each slot 16 are hammered back against the clamp 15 thus locking it in position. This prevents removal or movement of the clamp 15.

Figure 6:
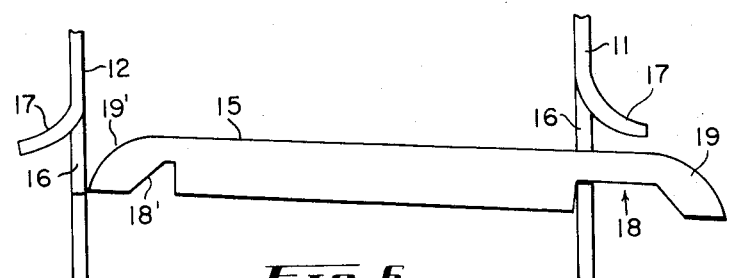
Figure 8:
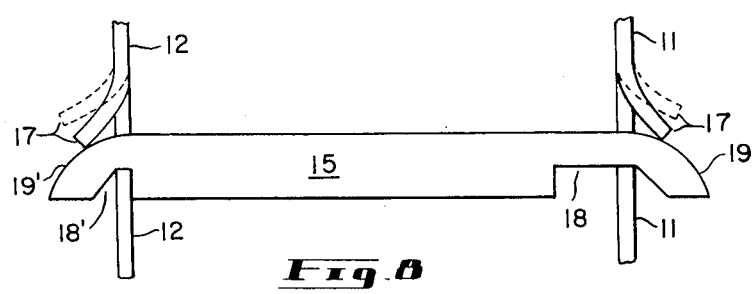

FIGURES 5 through 8 inclusive illustrate a preferred form of the invention in which the slot 18 formed at one end of the clamp 15 is longer than the slot 18' formed at the other end of the clamp. As shown in FIGURE 5 the length of the full depth portion of the slot 18' is shown as X, and as may be seen X is the distance from the end 19' to the point at which the slot 18' reaches its full depth. This difference in slot length is of great advantage in assembling this preferred form of the invention to a cable trough. In particular, and as shown in FIGURE 6, the end 19 of the clamp 15 is inserted through the slot 16 in the wall 11 and the slot 18 permits the full insertion of the end 19 without further bending of the tab 17 to the point where the end 19' will fit inside the cable trough. FIGURES 7a, 7b, and 7c show the successive steps in inserting the clamp 15 into a cable trough, in particular the end 19 is inserted into the slot 16 to the full depth of the notch 18 and the end 19' of the clamp may then be positioned opposite the slot 16 in the wall 12 after which the clamp 15 may be slid laterally to permit the slot 18' to engage the wall 12 as shown in FIGURE 8. As before the tabs 17 are then bent back against the edges 19 and 19' to lock the clamp 15 into the cable trough.

FIGURE 9 illustrates an alternative embodiment of the invention in which the notch 18 is only sufficiently large to accommodate the wall 11. The slot 16 is provided with a tab 17, the end of which has been removed so that the tab 17 may be bent back into the plane of the wall 11 once the clamp has been seated in position, to prevent removal of the clamp 15.

FIGURES 10a and 10b illustrate alternative and less desirable shapes for the ends of the clamps which would necessitate slots 16 in the trough wall of greater length that provided with the other embodiments which would be less desirable than with the preferred embodiments shown in FIGURES 5 through 8 inclusive.

In FIGURE 11 the assembly of a clamp 15 with a short notch through a normal sized slot 16 is illustrated. It may be seen that with a short notch it is necessary to bend the tab 17 at a sharp angle during insertion of the end 19 of the clamp into the slot 16. With this arrangement there is a danger that the tab 17 will break off when moved to the position shown in dotted lines and accordingly it is less desirable to provide a clamp 15 with a short slot than with the preferred embodiment shown in FIGURE 5.

FIGURE 12 illustrates an alternative means for accommodating a clamp 15 with a short notch 18 which requires that the slot 16 be much greater in extent and that the tab 17 be correspondingly longer. This permits a clamp 15 with a small notch 18 to be inserted through the slot 16 without risking breakage of the tab 17, however the tab 17 is correspondingly weaker and less able to resist forces which would tend to dislodge the clamp 15.

FIGURES 13a and 13b illustrate alternate forms of notches 18" and 18'" which may suitably be used with a clamp of the present invention, although as previously mentioned the clamp of FIGURE 5 is the preferred embodiment.

FIGURES 14a and 14b illustrate alternative forms of the clamp 15 which are shaped to conform to the cables being held. In FIGURE 14a the clamp is illustrated retaining three cables 14 in position against the bottom 13 of a cable trough 10. In FIGURE 14b the clamp 15 is shaped to conform to cables grouped in bundles of three (trefoil) whereby the cables may be suitably spaced and positioned without the necessity for binding the cables into groups prior to assembling in the trough.

It will be noted that to install each of the cable clamps illustrated above in accordance with the invention, that no special tools are required and no extra fasteners, such as nuts and bolts or other items, are needed in order to position and clamp the cables securely in the cable trough. Accordingly the invention provides an improved and simplified cable clamp structure which is adaptable for many varied applications.

We claim:
1. In combination, a cable trough for supporting a plurality of cables comprising a longitudinally extending bottom and upstanding side walls, said side walls being provided with pairs of oppositely disposed longitudinally extending slots with a tab on the exterior of each slot, and a clamp for holding said cables in fixed relation comprising a strip having a centre portion shaped to conform to the diameters of the cables and the required cable spacing, a notch in one edge of said strip adjacent each end of the strip, said ends being held in a pair of said slots by said tabs, whereby said clamp extends across said cable trough between the side walls thereof and holds said cables fixed relative to said trough.

2. The combination of claim 1, further including reinforcing means to increase the rigidity of the centre portion of said clamp.

3. The combination of claim 1 wherein the edge of said strip opposite to the edge containing said notches is curved to join said notched edge at each end of said strip.

4. The combination of claim 1 wherein said tab on the exterior of each slot comprises the material of said side wall displaced outwardly by the formation of said slot.

5. The combination as claimed in claim 1 in which each notch in said clamp has a sloping portion and a full depth portion, the length of the full depth portion of the notch in one end of the clamp longitudinally of the clamp being equal to the distance between the other end of the clamp and the point where the sloping portion joins the full depth portion of the other notch.

References Cited by the Examiner

UNITED STATES PATENTS

| | | | |
|---|---|---|---|
| 2,917,259 | 12/1959 | Hill | 248—68 |
| 3,035,800 | 5/1962 | McLeod | 248—68 |

FOREIGN PATENTS

| | | |
|---|---|---|
| 774,951 | 9/1934 | France. |
| 479,024 | 7/1929 | Germany. |
| 621,487 | 11/1935 | Germany. |
| 647,374 | 7/1937 | Germany. |
| 737,702 | 9/1955 | Great Britain. |

CLAUDE A. LEROY, *Primary Examiner.*